United States Patent [19]

Seltzer et al.

[11] Patent Number: 4,495,214

[45] Date of Patent: Jan. 22, 1985

[54] PROCESS FOR PRODUCING QUICK-COOKING PRODUCTS

[75] Inventors: Edward Seltzer, Teaneck, N.J.; William A. Hamilton, San Jose, Costa Rica

[73] Assignee: Rutgers Research & Educational Foundation, New Brunswick, N.J.

[21] Appl. No.: 566,181

[22] Filed: Dec. 28, 1983

Related U.S. Application Data

[63] Continuation-in-part of Ser. No. 307,614, Oct. 1, 1981.

[51] Int. Cl.³ .................................................. A23L 1/16
[52] U.S. Cl. ....................................... 426/557; 426/451
[58] Field of Search ............... 426/557, 451, 96–98, 426/653, 654, 508

[56] References Cited

U.S. PATENT DOCUMENTS

| | | | |
|---|---|---|---|
| 1,299,819 | 4/1919 | Bouchet | 426/557 |
| 1,570,443 | 1/1928 | McSorley | 426/557 |
| 2,704,723 | 3/1955 | Poole | 426/557 |
| 3,023,104 | 2/1962 | Battista | 426/557 |
| 3,162,536 | 12/1964 | Kaufmann | 426/557 |
| 3,192,049 | 6/1965 | Kinsley | 426/557 |
| 3,573,061 | 3/1971 | Glabe et al. | 426/557 |
| 3,574,634 | 4/1971 | Singer | 426/557 |
| 3,676,150 | 7/1972 | Glicksman et al. | 426/557 |
| 3,846,563 | 11/1974 | Cunningham | 426/557 |
| 4,044,165 | 8/1977 | Baumann | 426/557 |
| 4,098,906 | 7/1978 | Hisaki et al. | 426/557 |
| 4,208,439 | 6/1980 | Hsu | 426/557 |
| 4,243,689 | 1/1981 | Kokeguchi et al. | 426/557 |
| 4,368,210 | 1/1983 | Murakami et al. | 426/557 |
| 4,394,397 | 7/1983 | Lametillo | 426/557 |
| 4,423,082 | 12/1983 | Bauernfeind | 426/557 |

FOREIGN PATENT DOCUMENTS 1360933  4/1964  France .
1133407 11/1968  United Kingdom .

Primary Examiner—Raymond N. Jones
Assistant Examiner—Elizabeth A. Hatcher
Attorney, Agent, or Firm—Brumbaugh, Graves, Donohue & Raymond

[57] ABSTRACT

Quick-cooking pasta is made by (1) forming a dough comprising flour, water, a carbonate selected from the group consisting of edible alkali metal and ammonium carbonates, an acidic leavening salt and an interrupter, the dough having a bread dough-like consistency, (2) extruding the dough through an extrusion cooking device under conditions of pressure and temperature sufficient to permit reaction of the carbonate with the acidic leavening salt to produce carbon dioxide and sufficient to at least partially gelatinize the starch in the flour while forming the dough, and (3) drying the extruded formed pasta. A product is provided which will rehydrate within two minutes after addition of water at boiling temperature to provide a high quality cooked pasta.

23 Claims, 1 Drawing Figure

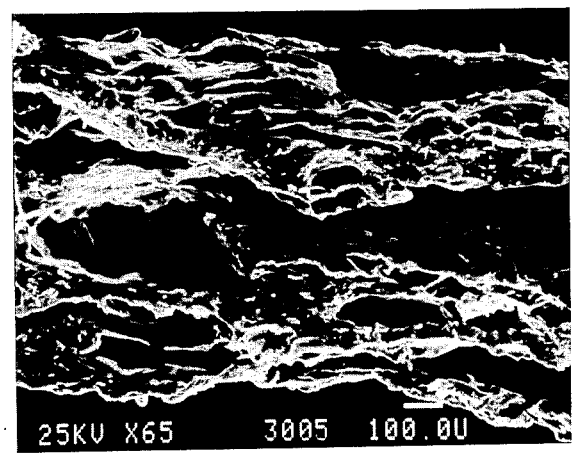

PROCESS FOR PRODUCING QUICK-COOKING PRODUCTS

This application is a continuation-in-part of application Ser. No. 307,614, filed Oct. 1, 1981.

This invention relates to a method of making quick-cooking pasta and to a quick-cooking pasta product. More particularly, the present invention provides a novel process for preparing pasta products which uses less energy than prior art processes and needs only a modest investment in equipment to produce a product which is readily dried to storage-stable moisture content. Further, the dried product of the invention will rehydrate within about two minutes after addition of water at boiling temperature to provide a high quality, ready-to-eat pasta of tender texture which remains intact and of good quality on standing over a period of time.

BACKGROUND OF THE INVENTION

The advent of instant soup mixes and other convenience foods of the dry variety has greatly increased the need for pasta products which will rehydrate within a short time to provide a product ready for immediate consumption Pasta products are conventionally made by moistening a mixture of dry ingredients with an amount of water only sufficient for compaction and plasticizing for forming the dough into the desired shape. Typical moisture contents for the dough stage are in the 30–34% by weight range. The dough may then be formed into a homogeneous sheet by successive passages between opposed heavy steel rolls, and the sheet is then continuously cut into noodle or macaroni pieces. Alternatively, extruders are used to form spaghetti and macaroni products. In this case, crumbly dough of about 30–34% moisture may be prepared in a vacuumized mixer, and the product is then fed to an extruder. The extruder is specially designed so as not to have a progressive cross-sectional area reduction. The purpose of this is to provide conditions during extrusion whereby the relative natural dispositions of the gluten and starch components of the flour, as well as their chemical and physical integrity, are largely maintained by avoiding arduous shearing and heating during extrusion. Mechanically generated heat is removed by cooling the extruder barrel to minimize protein coagulation and starch gelatinization. The pasta mass is shaped to spaghetti or macaroni forms by auguring it under pressure through die apertures.

Products formed using the above-described prior art process require elaborate drying methods to insure that physical instabilities do not develop in the pasta during drying. Rapid moisture removal, as by using high temperature or low humidity convective air flow, sets up stress within the pasta, and checking or cracking of the product during cooking results. Conventional pasta making procedures preserve rawness, cell-integrity and nondispersion of protein and starch; conventional cooking times range from 8 to 10 minutes in actively boiling water Recent prior art methods for making a quick-cooking pasta have adopted a number of approaches to the problem. U.S. Pat. No. 2,704,723 to Poole describes a process wherein the macaroni product is precooked prior to drying. The product requires a cooking time of 8–15 minutes and the cooked product is reported to have a slimy surface. In another approach, U.S. Pat. No. 3,192,049 to Kimsley et al. makes a dough containing hard wheat flour and added protein in the form of soy flour or wheat gluten. The dough is extruded, gelatinized by water or steam cooking, and dried. These products have a number of disadvantages including a complicated drying procedure, an undesirable flavor attributed to the high level of protein and a cooking time of 4–12 minutes in water at 97°–100° C.

U.S. Pat. No. 3,846,563 to Cunningham describes still another approach, where quick-cooking macaroni products are made using a precooked flour. The process described, while providing good quality products having a short cooking time, has the disadvantage of requiring relatively large amounts of energy.

More recent prior art processes are described in U.S. Pat. Nos. 4,098,906 to Hisaki et al. and 4,208,439 to Hsu. Hisaki et al. makes quick-cooking noodles with an aqueous emulsion of edible oil, heating the coated noodles with steam, and drying. Hsu makes an instant noodle by forming a sheet of gelatinized flour dough, subjecting the sheet to microwave energy to create therein pores of controlled size, shaping the pieces and drying. Each of these prior art processes require large amounts of energy, and the Hisaki process has the additional disadvantage of providing a product with a substantial oil content, which makes it unsuitable for many purposes.

In a co-pending application of one of the inventors herein, there is described a process for preparing quick-cooking pasta by combining flour, water, a carbonate selected from the group consisting of edible alkali metal and ammonium carbonates, and acidic leavening salt to form a dough and by thereafter extruding the dough under conditions which cause formation of carbon dioxide therein and at least partially gelatinize the starch present in the dough. The extruded and formed product is then dried to provide a quick-cooking pasta product which may be reconstituted within two minutes to provide a desirable reconstituted ready-to-eat pasta product.

When the product prepared by the process of the aforesaid co-pending application is reconstituted for consumption by the consumer, its texture is characterized by some elasticity and toughness or chewiness, which may be said to be characteristic of certain oriental pasta products. In preparing quick-cooking pasta for the market in the United States, it is often desired to provide for a somewhat softer or shorter texture, one which eliminates the chewiness or somewhat tough texture of the aforesaid product.

SUMMARY OF THE INVENTION

It has now been found that the texture of a quick-cooking pasta product prepared with leavening agents and extrusion cooking process described above may be adjusted to provide a product having a softer, less chewy consistency by providing in the dough a finely divided interrupter selected from the group consisting of cellulose fiber, cellulose crystalline material, grain bran, modified starch, coagulated egg yolk, heat denatured flour protein, cellulose ether, maltodextrin and flour pre-complexed with an edible monoglyceride.

Thus, a quick-cooking pasta product may be prepared by combining flour, water, a carbonate selected from the group consisting of edible alkali metal and ammonium carbonates, an acidic leavening salt and an interrupter to form a dough, and by thereafter extruding the dough under conditions which permit reaction of the carbonate with the acidic leavening salt or other acidic material in the dough to produce carbon dioxide, while at the same time at least partially gelatinizing the starch present in the dough. The dough is then immediately extruded from the cooker through an orifice designed to form the dough into the desired shape. The extruded and formed product is then dried to a storage-stable moisture content. Extrusion cooking of the pasta product in this manner is accomplished using less energy and less equipment than prior art processes require, and in addition, the subsequent drying may be conducted under less critical conditions and over a shorter period of time. Furthermore, a product is obtained which can be reconstituted in water in approximately two minutes to provide a highly satisfactory reconstituted pasta which has the further advantage of maintaining its good eating qualities over a period of time after reconstitution. In other words, it does not disintegrate into a pasty mass as do many instant pastas after standing in a rehydrated form for a short period of time. As an additional advantage, the presence of an interrupter provides a product of increased tenderness.

DESCRIPTION OF THE INVENTION

The basic ingredients which can be used in the instant pasta of my invention include the dry ingredients flour, a carbonate selected from the group consisting of edible alkali metal and ammonium carbonates, an acidic leavening salt and an interrupter. An extrusion aid is an optional and preferred ingredient, as is sodium chloride. In addition, where egg noodles are desired whole eggs, egg yolk solids and/or egg white solids are employed. Water is added to the dry ingredients to form a dough.

Any of the normal flours used in making pasta and as required by the standards of identity for pasta may be used in accordance with the present invention. The grade of flour can range in protein content from a 9% farina flour to gluten gum fortified flour having up to 13% protein. Of the various types which may be employed, it has been found that a higher starch content flour is less desirable because the final product tends to have a more chewy texture. When preparing egg noodles, for example, extra fancy durum flour gives a finished noodle with a deep, rich, golden color and is thus desirable. If a durum bran-fortified flour is used, the product has a characteristic brown color and the characteristic flavor of bran. Semolina, a course particle flour conventionally used to contribute a good color to pasta, is satisfactory; in general, most flour used in conventional pastas can be used in the product and process of the present invention.

Where egg yolk solids are employed in egg noodles, the standards of identity normally require that the ingredient be present at a level of at least 5.5% by weight, expressed as dried egg solids present in the finished dry weight of the product. The egg solids can be supplied either as fresh eggs, dried egg yolk, liquid eggs, or frozen eggs. In addition to providing a desirable color and protein content to the product, the egg yolk solids serve several additional functions. In preparing the dough, for example, it is advantageous to predisperse egg yolk solids in a portion of the water to form a thick slurry. This slurry is then added to the flour with subsequent improvement in the wetting characteristics of the flour during mixing. The moisture distributes more evenly. Further, addition of the acidic leavening salt and sodium bicarbonate to the egg solids slurry improves their distribution in the dough. The encapsulating material on the bicarbonate particles, when used, prevents premature reaction between the bicarbonate and the acid. However, when the reaction does occur within the heated extruder, it is apparently more efficient owing to the contiguity of the moistened bicarbonate and acid. Because of this increased efficiency, a reduced amount of acid may be used to provide a desired degree of porosity in the final product. It is convenient also to dissolve the sodium chloride in this slurry of egg yolk in water; adding the sodium chloride crystals directly to the flour does not insure that they will dissolve and some salt crystals persist in the dried product.

The extrusion aids which may be used according to this invention include materials such as glyceryl monostearate. One suitable material is sold under the trade name MYVAPLEX by the Eastman Chemical Products, Inc. Up to 2% of this material, based on the weight of dry ingredients of the dough, may be used in the formulations of the present invention, and it is employed to improve dough handling characteristics during the extrusion process.

Sodium chloride is used as an optional ingredient and may be added up to the level of about 5%, based on the weight of dry ingredients of the dough, depending upon the amount required for seasoning purposes.

The carbonate selected from the group consisting of edible alkali metal and ammonium carbonates which may be used in accordance with this invention may be sodium bicarbonate, ammonium carbonate, ammonium bicarbonate, potassium bicarbonate, or other edible alkali metal carbonates or bicarbonates.

Most of the carbonates that are useful according to this invention require encapsulation to prevent premature reaction of the carbonate with acid during dough preparation steps. Of these, sodium bicarbonate is preferred. The preferred level of sodium bicarbonate, disregarding the weight of encapsulating material, is about 0.5 to 1.0%, based on the weight of dry ingredients of the dough. Expressed in terms of the encapsulated product, the preferred level is about 1-2%.

Certain carbonates, namely ammonium carbonate and ammonium bicarbonate function without encapsulation. Thus, in formulations where the presence of encapsulating material is not desired, as when it provides an undesirable off-flavor, the use of ammonium carbonate or ammonium bicarbonate is preferred.

The manner in which the reaction between the carbonate and the acidic leavening salt increases the quick-cooking properties of the final product is not fully understood. It is thought, however, that reaction between the carbonate and acid releases $CO_2$ only during the extrusion cooking step and causes the formation of tiny open spaces, sometimes termed vacuoles, in the final product which facilitates rapid water penetration during rehydration. It is also thought that the presence of the acidic leavening salt and carbonate promote gelatinization of starch by reducing the temperature required for gelatinization. Regardless of the mechanism involved, it has been established that extrusion cooking of the pasta without the carbonate ingredient provides a product which rehydrates incompletely and which has hard uncooked centers.

The carbonate is encapsulated with edible, water insoluble materials such as hydrogenated vegetable fats having a melting point in the range of about 50°-75° C. One preferred material is hydrogenated soybean oil having a melting point of about 65° C., and this material is combined with the bicarbonate as a coating for the particles to provide a free-flowing powder containing 45–50% sodium bicarbonate. The purpose of encapsulation is to prevent premature leavening reaction because of contact with acid during the dough mixing stage. The conditions of extrusion cooking produce elevated temperature and pressure, as well as intensive shearing of the particles within the extruder. These conditions cause release of the carbonate from the encapsulating fat for reaction with the acid.

The carbonate has also been encapsulated with a film of edible protein, such as egg albumen with success. To reduce an aftertaste thought to be caused by a saponification reaction between the carbonate and fats in the dough from either the encapsulation fat, egg yolk, or other sources, a carbonate has been coated with egg albumen. Thus, in one embodiment, spray dried egg albumen solids are mixed with water sufficient to form a paste in a mortar, and ammonium bicarbonate is intimately mixed into the paste with a pestle. Alternatively, fresh or liquid egg albumen thawed from frozen liquid egg albumen may be used. The paste is then mixed with reasonable promptness with flour in a blender and the balance of the dough ingredients then mixed. In this manner, it is thought that the protein forms a barrier which prevents or minimizes unwanted saponification reaction with the carbonate.

The acidic leavening salts which are useful according to this invention include sodium acid pyrophosphate, sodium aluminum sulphate, sodium aluminum phosphate, potassium acid tartrate, and monocalcium phosphate monohydrate, $CaH_4(PO_4)_2 \cdot H_2O$. While these acidic substances are known to react with basic carbonates at different rates during baking, it has been found that under the shear, heat and pressure conditions within the extruder, the reaction rate for each of these acid materials is the same. Of these acidic leavening salts, monocalcium phosphate monohydrate is preferred, because its major reaction product, disodium phosphate, is fully compatible with prepared pasta.

The monocalcium phosphate monohydrate, if unreacted, imparts a residual sour aftertaste to the finished pasta. For that reason, it should be used at a level designed to insure its complete reaction. It has been found that natural acids in other pasta ingredients help to neutralize the carbonate and consequently the provision of the monocalcium phosphate monohydrate at a level at about one-half the stoichiometric amount required to neutralize the carbonate present is usually sufficient to obtain the desired quick-cooking properties in the product without undesirable sour aftertaste being present. The preferred level is about 0.25 to 0.75% by weight of the dry ingredients in the dough.

The term "interrupters" is used herein and in the appended claims to describe a class of ingredients which have been found to reduce the chewiness or shorten the texture of the instant pasta of the present invention. The "shortness" characteristics imparted by the interrupters of the invention is somewhat similar to the texture imparted by adding fats or oils to doughs. The manner in which these materials function is not known, although it is thought that to some extent at least they serve to interrupt the gelatinized starch and/or continuous gluten matrix of the product.

Suitable interrupters as used according to the present invention include finely milled bulky plant materials such as cellulose and grain brans such as wheat bran. Other materials which are satisfactory include certain modified starches such as a product called "Baka-Snak", a modified starch sold by the National Starch and Chemical Company. This starch is a pregelatinized hybrid corn starch which is reacted with acetic acid to cause acetylation and then with adipic acid to cause cross-linking between the starch molecules to form dimers. Another suitable modified starch is sold by National Starch and Chemical Company under the name "Crystal Gum". This material is a tapioca starch which is dextrinized by dry heating in the presence of a small amount of a mineral acid such as HCl.

Another suitable interrupter is a flour pre-complexed with glyceryl monostearate. This interrupter is formed by causing glyceryl monostearate to complex with flour whereby a portion of the starch component of the flour forms an inhibited starch. This complexed material is formed by the extrusion cooking of a mixture of flour and glyceryl monostearate in the presence of added water sufficient to form a dough. The extruded product is dried and ground to the desired particle size.

The flour which may be used in preparing this pre-complexed product may be any of the flours described above as being useful in preparing the instant pasta of the present invention. Similarly, the glyceryl monostearate may be supplied as the MYVAPLEX product described above in discussing extrusion aids useful according to the present invention. Another suitable product, also manufactured and sold by the Eastman Chemical Products, Inc., is the emulsifier MYVATEX (Mighty Soft), a powdered distilled monoglyceride softener.

The pre-complexed flour interrupter may be employed to advantage at levels of 5–15% of the total dry pasta weight and preferably contains sufficient glyceryl monostearate to provide a level thereof of from about 1 to 2% based on the total dried pasta weight. It is also observed that when using the pre-complexed flour interrupter, the glyceryl monostearate therein provides sufficient extrusion aid activity to obviate the need for the separate addition of an extrusion aid.

The use of the pre-complexed flour interrupter provides a product which rehydrates merely by the addition of freshly boiled water followed by stirring and allowing the product to stand for two minutes. The texture is as soft as conventional pasta. As a further advantage, the pasta of the present invention contains only materials which have received FDA approval as optional ingredients under the Federal Definitions and Standards of Identity for Macaroni and Noodle Products.

Other suitable interrupters include refined cellulose fiber such as "Solka-Floc" sold by Brown Company, a division of James River, Inc., and crystalline cellulose sold under the trademark AVICEL by FMC Corporation. Solka Floc is made from bleached, virgin wood pulps, primarily from birch, maple and beech. The bleached, delignified pulps are processed mechanically, first by shredding and then by other means to reduce the fiber length. Avicel is a purified edible grade of cellulose in the form of spray dried cellulose crystallite aggregates. The material is derived from wood fiber or cotton linters. Other interrupters include heat denatured flour protein, coagulated egg yolk, and various soluble carbohydrates such as low dextrose equivalent corn syrup solids and cellulose ethers such as carboxy methylcellulose.

It has been noted that particle size of the interrupter used has some influence on the degree of tenderness imparted by its use. The interrupter having finer particle size provides a greater number of particles per unit weight, and the fine particle size, such as 400 mesh, will provide a greater tenderizing effect, per unit weight, than the same material having a 200 mesh particle size. This is of particular importance in the case of the interrupters which are insoluble or slowly soluble in water, such as the cellulose, the modified starches and the grain bran, where particle sizes in the range of 200-400 mesh have been found to be suitable; at a given level, the finer mesh materials provide a more tender product.

The interrupters are used in accordance with this invention as a replacement for flour and may be used at levels up to 20% of the normal flour component. Levels of 5-15% are preferred. In practice, this means that from about 2 to 20% by weight of the dry ingredients of the dough are interrupters. Furthermore, some of the interrupters are more effective than others in regulating the texture of the final product and the texture may be varied somewhat by varying the level of interrupter used within the above described ranges.

The ingredients described above are preferably formed into a dough and the dough thoroughly mixed prior to the extrusion cooking step of the present invention. The dough is most conveniently made by first dry-blending the interrupter and flour to obtain a uniform mixture and then mixing the mixture of flour and interrupter in a planetary dough mixer with an aqueous slurry containing an encapsulated carbonate selected from the group consisting of edible alkali metal and ammonium carbonates and the acidic leavening salt component together with egg yolk solids, if used. When sodium chloride is used in the formulation, it is preferably first dissolved in the aqueous slurry of egg yolk, before mixing with the balance of the dough. A dough is then formed of bread dough-like consistency containing about 35-41% moisture. It has been found that the high moisture dough extrudes better under the high temperature conditions of the present invention than does the drier, crumbly dough of 30-33% moisture which is typical of conventional pasta manufacture.

After preparation of the dough, it is then passed through an extrusion cooking apparatus. One suitable apparatus is a laboratory extruder cooker Model 2003, C. W. Brabender Instrument Company, Inc., S. Hackensack, N.J., having a screw length of 15 inches and a compression ratio of 3:1. The cooker was provided with three separate temperature zones, two on the barrel and one at the die, and suitable operation conditions include a screw speed of 140 R.P.M. with temperature in two zones of the cooker of 150° C., and 115° C. at the die. A suitable range of cooking temperatures at elevated pressures is about 115°-160° C. Another suitable temperature profile is 110° C., 150° C., and 140° C., the latter being the temperature of the die exit. Dough passing toward the die orifice has a temperature measured at 137°-138° C. under these conditions.

One die which is suitable for use provides a 1 inch ribbon extrudate and by inserting evenly spaced wire separators in the die parallel to the direction of flow, it can be made to extrude several noodle ribbons of narrower width. The height of the aperture is typically 0.025 inches.

The dough may be fed into the extruder by hand. The exiting extrudate has a toothpaste-like consistency. Time of passage through this relatively small extrusion cooking system may be in the range of 11-15 seconds. A larger, commercial-sized extruder-cooker having a larger barrel may take a longer time, e.g. 50-80 seconds, with barrel temperature adjusted to give comparable heat treatment.

Much of the moisture in the dough is flashed off from the extruded pasta ribbon as it leaves the die orifice, the moisture content typically being reduced to about 30%. This constitutes a reduction of about 20-25% of the moisture in the feed.

The extrudate may then be deposited on a screen or perforated metal tray and dried in a conventional flowing hot air dryer at 65°-75° C. for 30-45 minutes to a final moisture content of 9-11% by weight.

Examination of the dried product under magnification discloses that it contains voids, vacuoles, and numerous small tunnel-like openings parallel to the direction of extrusion, all of which are evidence of the formation of gas pockets which form during the extrusion cooking process. Furthermore, no discreet starch grains are visible, thus evidencing a substantially complete gelatinization of the starch content of the flour. This has been confirmed analytically. To the naked eye, however, the product has an appearance similar to that of conventional dense pasta, and it is not conspicuously puffed as in the case of expanded cereal snacks.

Upon reconstitution in freshly boiled hot water for two minutes followed by decanting of the water, the instant pasta of the invention provided a product which was slightly chewy but ready to eat and which maintained its integrity without disintegrating.

The invention will be further described with reference to the following specific examples:

EXAMPLE 1

A dry mix of the following ingredients was prepared:
200 grams of flour, comprising 50% durum patent flour and 50% winter wheat flour
12.0 grams of egg yolk powder (containing 2% sodium silico aluminate to prevent caking)
4.0 grams of glyceryl monostearate (MYVAPLEX provided by Eastman Chemical Products, Inc. containing 90% or more monoester)
7.0 grams of sodium chloride
3.2 grams of fat encapsulated sodium bicarbonate (containing 50% $NaHCO_3$ coated with partially hydrogenated soybean oil having a melting point of about 65°-66° C.)
1.0 gram of monocalcium phosphate monohydrate (food grade, Stauffer Chemical Company).

To prepare the dough, the egg yolk powder was slurried in 50 ml. of tap water at room temperature. After a slurry was obtained, the sodium chloride was dissolved therein and the encapsulated sodium bicarbonate and monocalcium phosphate monohydrate were then added to the slurry. The slurry, together with an additional 50 ml. of water was then added to the flour with mixing in a planetary batch mixer using a flat blade paddle. After mixing for four minutes, a dough of bread dough-like consistency containing 37-39% water was obtained.

The dough was then fed to an extruder cooker which was a C. W. Brabender Model 2003 (Prep Center) having a ¾ inch diameter screw, an effective screw length of about 15 inches with a length to barrel diameter ratio (L/D) of 20:1. The barrel was rifled straight horizontally to favor more mixing shear. There were two heating zones in the barrel or jacket, electrically heated and with automatic compressed air flow supply for temperature modulation control of the barrel jacket temperature. An electrically heated die was attached, also controllable for temperature. The three heater zones were controlled via thermocouples inserted through barrel or die borings. The die orifice was a 0.025 inch slit, about one inch wide, for producing a continuous pasta ribbon of these two dimensions. The orifice channel was subdivided by inserting in the open slit several parallel wire dividers, which produced thereby 4 parallel narrow pasta ribbons, about ¼ inch wide. Typical capacity was 10-14 lb. of dough per hour. Residence time was 7 seconds when first starting with an empty barrel and die entry orifice and up to 10-15 seconds when at a steady state at a rotary screw speed of 140 R.P.M. Compression ratio within the flow space of the barrel was 3:1 by widening of the shaft diameter in the direction of the discharge die. While operating pressure may vary between 150-500 psig, a pressure of 200 to 250 psig measured behind the die orifice was employed in this example.

With the temperatures of zone 1 and zone 2 controlled at 150° C. and the die temperature controlled at about 115° C., the dough was continuously fed to the extruder cooker to provide a residence time in the cooker of about 10-15 seconds. Upon extrusion, the dough expanded to atmospheric pressure to provide noodles of toothpaste-like appearance. The product was then dried on expanded metal tray surfaces in a cross-circulation flowing hot air dryer at 68°-74° C. for about 40 minutes.

Examination of the dried noodle product under magnification shows that it has conspicuous puffing or entrapment of elongated tubular vacuoles. Without magnification, the noodle has the uniformity and translucency of dense stained glass. The dried product is not conspicuously puffed, the porosity being apparent mainly under magnification.

EXAMPLE 2

Noodles were made in accordance with the procedures and formula set forth in Example 1 except that 20 grams of a modified starch, Baka-Snak, a product having a particle size of about 200 mesh, sold by the National Starch and Chemical Company was used in place of 20 grams of flour.

EXAMPLE 3

An egg noodle was prepared in accordance with the procedures and formula set forth in Example 1 except that 20 grams of Solka-Floc DW 300 cellulose, a product having a particle size mainly of 300 mesh, was used in place of 20 grams of the flour component.

EXAMPLE 4

An egg noodle product was made following the procedures and formula set forth in Example 1 except that the egg yolk solid was supplied by using pre-cooked (coagulated) egg yolk solids.

EXAMPLE 5

A quick-cooking egg noodle was prepared in accordance with the procedures and formula set forth in Example 1, except that 10 grams of Solka-Floc 400 cellulose, a product the major portion of which had a particle size finer than 300 mesh, was used in place of 10 grams of the flour component.

FIG. 1 of the attached drawing is a photomicrograph of pasta made in accordance with this example. The cellulose had a particle size mainly finer than 300 mesh and was used at a level sufficient to replace 5% of the flour of Example 1. Examination of the dried noodle product of this Example under magnification shows that it has conspicuous puffing and elongated tubular vacuoles. In addition, discrete particles of interrupter are visible, embedded in the continuous noodle matrix. Without magnification, the noodle has the uniformity and translucency of dense stained glass. The dried product is not conspicuously puffed, the porosity being apparent mainly under magnification.

The egg noodles prepared according to each of the Examples 1, 2, 3, 4 and 5 above were rehydrated with freshly boiled water for two minutes and evaluated. There was no disintegration after rehydration and long standing. Each of the products of Examples 2, 3, 4 and 5 were significantly more tender than the product of Example 1 which contained no interrupter. The product containing the modified starch at a 10% replacement level for flour, i.e. the product of Example 2, was substantially more tender than the products of Examples 3, 4 and 5.

As an additional evaluation, samples of each of the Examples 1, 2, 3 and 4 were rehydrated and tested for shear values and rehydration ratios. The rehydration ratios were obtained by dividing the weight of the noodles after rehydration by their dry weight before rehydration. The shear value for each sample was obtained by the following procedure:

A rehydrated pasta sample representing 30 grams of original dry weight noodles was, after rehydration, subjected to deformation and shear testing in a Kramer shear cell using an Instron testing machine, Model TM, Instron Inc., Canton, Mass.

In performing this test, a descending vertical shaft, at a fixed slow rate of 2 inches per minute, drove a stack of uniformly spaced bar knives through parallel slit cover openings into a steel box wherein the moist noodles were piled randomly. Deformation and cutting resistance to the descent of the knives were automatically recorded as force values versus time which plotted kilograms or pounds of force per unit area of the shear cell. A peak would be reached for the final cutting force. The numerical values were used to evaluate toughness or tenderness.

High shear values denote high resistance to shear (therefore more "chewy"). Higher rehydration ratios usually relate to lower shear values.

Subjecting the products made in Examples 1–4 to the rehydration ratio calculations and shear tests provided the following information:

TABLE I

| Example | Rehydration Ratio | Shear Value Instron, lbs. force per area of cell |
| --- | --- | --- |
| 1 | 2.62 | 69 |
| 2 | 3.30 | 29 |
| 3 | 2.72 | 31 |
| 4 | 2.66 | 58 |

EXAMPLE 6

A number of pastas were made according to the present invention, following the process set forth in Example 1, above, with certain variables, as set forth in the Table below. The rehydration ratio and shear value of each were obtained, as were the same values for a control pasta made without acidic leavening salts and encapsulated sodium bicarbonate. A second control is included, which was prepared by steaming conventional raw pasta for a time sufficient to render it quick-cooking on drying. Table II below shows the results obtained:

TABLE II

| Pasta Sample | Rehydration Ratio | Shear Value Instron lbs. per area of cell |
|---|---|---|
| i. Extrusion cooked, as Example 1, but with no leavening salts or bicarbonate; 2 min. rehydration | 2.1 | 65.6 |
| ii. Extrusion cooked, as Example 1; 2 min. rehydration | 2.7 | 51 |
| iii. Conventional raw rolled pasta, steamed 4 min. rehydration | 2.9 | 52.5 |
| iv. Extrusion cooked, as Example 3, 10% Solka Floc cellulose; 2 min. rehydration | 3.7 | 38.0 |
| v. Same as iv, but with 10% Avicel cellulose in place of Solka Floc | 3.5 | 36.5 |
| vi. Same as iv, but with 10% modified starch, Baka Snak, NSC | 3.3 | 31.0 |
| vii. Same as iv, but with 10% Crystal Gum, NSC | 3.2 | 33.0 |
| viii. Same as iv, but with 15% Solka Floc cellulose | 4.0 | 19.0 |

EXAMPLE 7

Section A

A preferred interrupter for use in accordance with the present invention in the form of a flour pre-complexed with glyceryl monostearate was prepared in accordance with the following procedure:

30 grams of MYVAPLEX 600, a powdered, concentrated glyceryl monostearate sold by the Eastman Chemical Products, Inc., and 255 grams of a flour consisting of 50% durum patent flour and 50% winter wheat flour were pre-blended, dried and sifted three times. The blend was then made into a dough with water added in the amount of 130 ml.

The dough was extrusion-cooked by passing it through an extruder cooker of the type defined in Example 1, i.e. a modified Brabender Model 2003. The dough is extruded through round perforated die holes 0.060 inches in diameter using a 3:1 compression screw extruder rotating at 140 rpm with the body heated to 150° C.

The product was extruded in the form of rods which were dried in a hot air convection dryer for 35-40 minutes with air at 155°-160° F. The dried rods at 7-10% moisture were then milled to a fine powder in an Alpine pilot plant model hammer mill fitted with a screen of 20 to 40 mesh openings to produce a pre-complexed flour useful as an interrupter in preparing the instant pasta of the present invention. The product had a particle size such that a substantial proportion thereof passed through a 100 mesh screen.

Section B

Two pastas were made according to the present invention following the process set forth in Example 1 based upon the following formulations:

| | Formulation No. 54 | Formulation No. 56 |
|---|---|---|
| Flour (50% durum patent flour and 50% winter wheat flour) | 275 g. | 250 g. |
| Pre-complexed flour (prepared in Example 7(A) above) | 25 g. | 50 g. |
| Egg yolk powder | 19.5 g. | 19.5 g. |
| Salt | 10.5 g. | 10.5 g. |
| Fat-Encapsulated NaHCO3 (50% fat) | 4.8 g. | 4.8 g. |
| Monocalcium phosphate monohydrate | 1.25 g. | 1.25 g. |
| Water added to form dough | 162 cc. | 174 cc. |

The flours were pre-sifted together three times and the other ingredients were added to the flour blend as a slurry/solution made with the water. After mixing in the bowl of a planetary mixer for about two minutes to form stiff, but not sticky, doughs, the doughs were extrusion cooked in the Brabender extruder of Example 1 operating with screw speed at 140 rpm and with two barrel sections heated to 150° C. Each formulation was separately formed as both rods and ribbons. When making ribbons, the ribbon die section was heated to 115° C. The rod die was relatively flush with the end of the extruder and was heated indirectly by contact with the barrel end. The ribbon die was adjusted to have an opening width of 0.025 inches, whereas the rod die had numerous holes drilled to 0.060 inches in diameter. The extruded products were dried about 40 minutes in flowing hot air at 155°-160° F.

The pasta products made above were reconstituted to edibility by adding boiling water, stirring briefly and allowing to stand 1½ to 2 minutes before eating. The rehydration and texture were comparable to conventional pasta that may have required active cooking in boiling water for up to 12 minutes. Confirmatory shear tests by Instron machine given in the table below show that texture can be tenderized to various degrees by varying the amount of precomplexed flour used in the pasta dough formulation. As would be expected from the thinner dimension of the ribbons, the degree of rehydration of these was far more advanced under the conditions of this test than that of the rods.

| | Formulation No. 54 | | Formulation No. 56 | |
|---|---|---|---|---|
| | Rods | Ribbons | Rods | Ribbons |
| Rehydration ratio | 2.23 | 2.48 | 2.19 | 2.9 |
| Instron shear, ave. in relative values kg. | 46 | 29 | 48 | 27 |

EXAMPLE 8

An interrupter for use in accordance with the present invention was prepared in accordance with the procedure outlined in Example 7, Section A, except that MYVATEX Mighty Soft softener, a powdered distilled monoglyceride prepared from an edible vegetable oil and sold by the Eastman Chemical Products, Inc. was used in place of the MYVAPLEX 600, all of the ingredients and proportions thereof otherwise being the same.

A pasta was made following the process set forth in Example 1 based on the following formulation:

| Formulation | |
|---|---|
| Flour (50% durum patent and 50% winter wheat) | 250 g. |
| Pre-complexed flour/MYVATEX, made as in Example 7A. | 50 g. |
| Spray dried egg yolk solids | 12.0 g. |
| Spray dried egg albumen solids | 7.5 g. |
| NaCl | 9.0 g. |
| NH₄HCO₃ | 4.0 g. |
| Monocalcium phosphate monohydrate | 1.6 g. |
| Water | 160 ml |

The flours were combined with the other ingredients and the pasta was made following the procedure set forth in Example 7, Section B, except that the Barbender extruder was operated at a screw speed of 140 r.p.m., and the temperature conditions across the die were as follows:
Zone 1:110° C.
Zone 2:150° C.
Die Plate: 140° C.

The dough was extruded as a ribbon through an opening adjusted to a height of 0.025 inches and a width of 0.25 inches and the extruded noodle products were dried about 40 minutes in flowing air at 160° F. to a moisture content of 9–12%.

The pasta products made according to this Example were reconstituted by adding boiling water thereto, stirring briefly, and allowing them to stand for about two minutes. The resulting reconstituted product was an edible noodle of good texture and flavor having a rehydration ratio of 3.90.

We claim:

1. A process for making quick-cooking pasta comprising the steps of:
   (a) combining flour, water, a carbonate selected from the group consisting of edible ammonium carbonate and edible encapsulated alkali metals, an acidic leavening salt, and an interrupter to form a dough, said interrupter being present in an amount sufficient to improve the consistency of the final product,
   (b) extruding the dough through an extrusion cooker under conditions of pressure and temperature sufficient to permit the carbonate to react with the acidic leavening salt and to at least partially gelatinize the starch in the flour while forming the dough, and
   (c) drying the extruded formed pasta.

2. The process of claim 1, wherein the carbonate contained in the dough is encapsulated in hydrogenated vegetable oil having a melting point in the range of about 50 to 75° C. and wherein the extrusion conditions comprise an elevated pressure and a temperature in the range of about 115°–160° C.

3. The process of claim 1, wherein the acidic leavening salt is monocalcium phosphate monohydrate, and the carbonate is sodium bicarbonate, encapsulated in soybean oil, hydrogenated to a 65°–66° C. melting point.

4. The process of claim 1, wherein the acidic leavening salt is sodium aluminum phosphate.

5. The process of claim 1, wherein the carbonate is selected from the group consisting of ammonium carbonate and ammonium bicarbonate.

6. The process of claim 1, wherein the dough leaving the extrusion cooker is substantially completely gelatinized.

7. The process of claim 1, wherein the interrupter is a finely divided material selected from the group consisting of cellulose fiber, cellulose crystalline material, modified starch, grain bran, coagulated egg yolk, heat-denatured flour protein, cellulose ether, maltodextrin, and flour pre-complexed with glyceryl monostearate.

8. The process of claim 3, wherein the monocalcium phosphate monohydrate is present at a level of approximately one-half the stoichiometric amount needed to neutralize the carbonate in the dough.

9. The process of claim 1, wherein the interrupter is a modified starch.

10. The process of claim 1, wherein the interrupter is cellulose.

11. The process of claim 1, wherein the interrupter is flour pre-complexed with glyceryl monostearate.

12. The process of claim 1, wherein the dough has the consistency of bread dough and contains about 35°–41% water.

13. A process for making quick-cooking pasta comprising the steps of:
   (a) forming a dough containing about 35–41% water, from dry ingredients comprising flour, about 1–2% sodium bicarbonate encapsulated in hydrogenated vegetable oil having a melting point of about 50°–75° C., up to 2% glyceryl monostearate, 0.5 to 1% monocalcium phosphate monohydrate, and about 2 to 20% interrupter, the % being by weight of the dry ingredients in the dough,
   (b) passing the dough through an extrusion cooker under elevated pressure at a temperature in the range of 115°–160° C. to release the bicarbonate from its encapsulation and permit it to react with the monocalcium phosphate monohydrate in the dough to produce carbon dioxide and to at least partially gelatinize the starch in the flour while forming the dough, and
   (c) drying the extruded formed pasta.

14. The process of claim 12, wherein the interrupter is flour pre-complexed with glyceryl monostearate, the interrupter is present at a level of about 5 to 15%, by weight of the dry pasta, and the glyceryl monoglyceride is present in the range of about 1 to 2% by weight of the dry pasta.

15. A process for making quick-cooking egg noodles comprising:
   (a) preparing a dough containing flour, egg yolk solids, sodium chloride, an extrusion aid, encapsulated sodium bicarbonate, monocalcium phosphate monohydrate, and interrupter, said interrupter being present in an amount sufficient to improve the consistency of the final product,
   (b) passing the dough through an extruder-cooker under pressure and at a temperature sufficient to release the sodium bicarbonate from its encapsulation, permitting it to react with the monocalcium phosphate monohydrate in the dough to produce carbon dioxide and to at least partially gelatinize the starch and the flour while forming the dough, and
   (c) drying the extruded, formed pasta.

16. The process of claim 14, wherein the dough is of bread dough-like consistency having a moisture level of 35–41%, the sodium bicarbonate is encapsulated in about an equal amount, by weight, of hydrogenated soybean oil having a melting point of 65°–66° C., the encapsulated bicarbonate is present at a level at about 1–2% by weight of the dry ingredients of the dough, the interrupter is finely divided plant material having a particle size in the range of about 20–400 mesh, present at a level of 2 to 20% of the dry ingredients of the dough, and the monocalcium phosphate monohydrate is present at a level at about 0.5 to 1% of the dry ingredients of the dough, the extruding being accomplished at a temperature of about 115°–160° C., under an elevated pressure.

17. The process of claim 15, wherein the interrupter is a modified starch.

18. The process of claim 15, wherein the interrupter is finely divided wheat bran.

19. The process of claim 15, wherein the interrupter is flour pre-complexed with glyceryl monostearate, or distilled monoglycerides and has a particle size such that a substantial portion thereof is in the range of about 100 mesh or finer.

20. A process for making quick-cooking pasta comprising the steps of:

(a) preparing a dough containing flour, water, egg albumen solids, a carbonate selected from the group consisting of ammonium carbonate and ammonium bicarbonate, an interrupter, said interrupter being present in an amount sufficient to improve the consistency of the final product, and an acidic leavening salt, (b) passing the dough through an extrusion cooker under pressure at a temperature sufficient to release carbon dioxide from the carbonate and to at least partially gelatinize the starch and flour while forming the dough, and (c) drying the extruded formed pasta.

21. The process of claim 20, wherein the carbonate is intimately mixed with an aqueous paste of egg albumen solids prior to mixture thereof with other dough ingredients.

22. The process of claim 21, wherein the interrupter is flour pre-complexed with glyceryl monostearate or distilled monoglycerides.

23. The process of claim 1, wherein the conditions in step (b) thereof are sufficient to substantially gelatinize the starch in the flour.

* * * * *